United States Patent
Yao et al.

(10) Patent No.: US 7,525,769 B2
(45) Date of Patent: Apr. 28, 2009

(54) MICRO-ACTUATOR HAVING SWING SUPPORT TO ALLOW HORIZONTAL SWINGING MOVEMENT OF SLIDER SUPPORT

(75) Inventors: Ming Gao Yao, Dongguan (CN); Masashi Shiraishi, Kowloon (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 434 days.

(21) Appl. No.: 10/831,954

(22) Filed: Apr. 26, 2004

(65) Prior Publication Data

US 2005/0117262 A1 Jun. 2, 2005

(30) Foreign Application Priority Data

Nov. 27, 2003 (WO) .................... PCT/CN03/01007

(51) Int. Cl.
 G11B 21/10 (2006.01)
 G11B 21/24 (2006.01)
 G11B 5/596 (2006.01)
(52) U.S. Cl. .................................................. 360/294.4
(58) Field of Classification Search .............. 360/294.4, 360/294.1
 See application file for complete search history.

(56) References Cited

U.S. PATENT DOCUMENTS

| 5,739,982 | A | 4/1998 | Arya et al. ................... 360/104 |
| 5,898,541 | A | 4/1999 | Boutaghou et al. .......... 360/109 |
| 6,233,124 | B1* | 5/2001 | Budde et al. ............. 360/294.4 |
| 6,268,983 | B1* | 7/2001 | Imada et al. ............. 360/294.4 |
| 6,310,750 | B1* | 10/2001 | Hawwa et al. ........... 360/294.4 |
| 6,614,627 | B1* | 9/2003 | Shimizu et al. .......... 360/294.4 |
| 7,177,119 | B1* | 2/2007 | Bennin et al. ............ 360/294.6 |
| 2001/0021086 | A1* | 9/2001 | Kuwajima et al. ....... 360/294.4 |
| 2002/0071221 | A1* | 6/2002 | Maikuma ................. 360/294.4 |
| 2002/0075606 | A1* | 6/2002 | Nishida et al. ........... 360/294.4 |
| 2002/0080532 | A1* | 6/2002 | Fukiwara et al. ......... 360/294.4 |

FOREIGN PATENT DOCUMENTS

| CN | 1321983 A | 11/2001 |
| JP | 2002074871 A2 | 3/2002 |
| JP | 2002133803 A2 | 5/2002 |

* cited by examiner

*Primary Examiner*—Craig A Renner
(74) *Attorney, Agent, or Firm*—Kenyon & Kenyon LLP

(57) ABSTRACT

A thin film piezoelectric (PZT) micro-actuator is disclosed. Two thin film pieces of PZT are couple to a slider support frame. The slider support frame has a slider support connected by a leading beam to a base. The two thin film pieces of PZT connect the slider support to the base. Applied voltage causes the thin film pieces of PZT to contract or expand, moving the slider support in relation to the base. The thin film pieces of PZT can be single or multiple layers. The thin film PZT micro-actuator can be coupled to the suspension by anisotropic conductive film, with the thin film pieces of PZT between the slider support frame and the suspension. Alternately, the thin film PZT micro-actuator can be coupled to the suspension with the thin film pieces of PZT exterior to the slider support frame and the suspension.

9 Claims, 13 Drawing Sheets

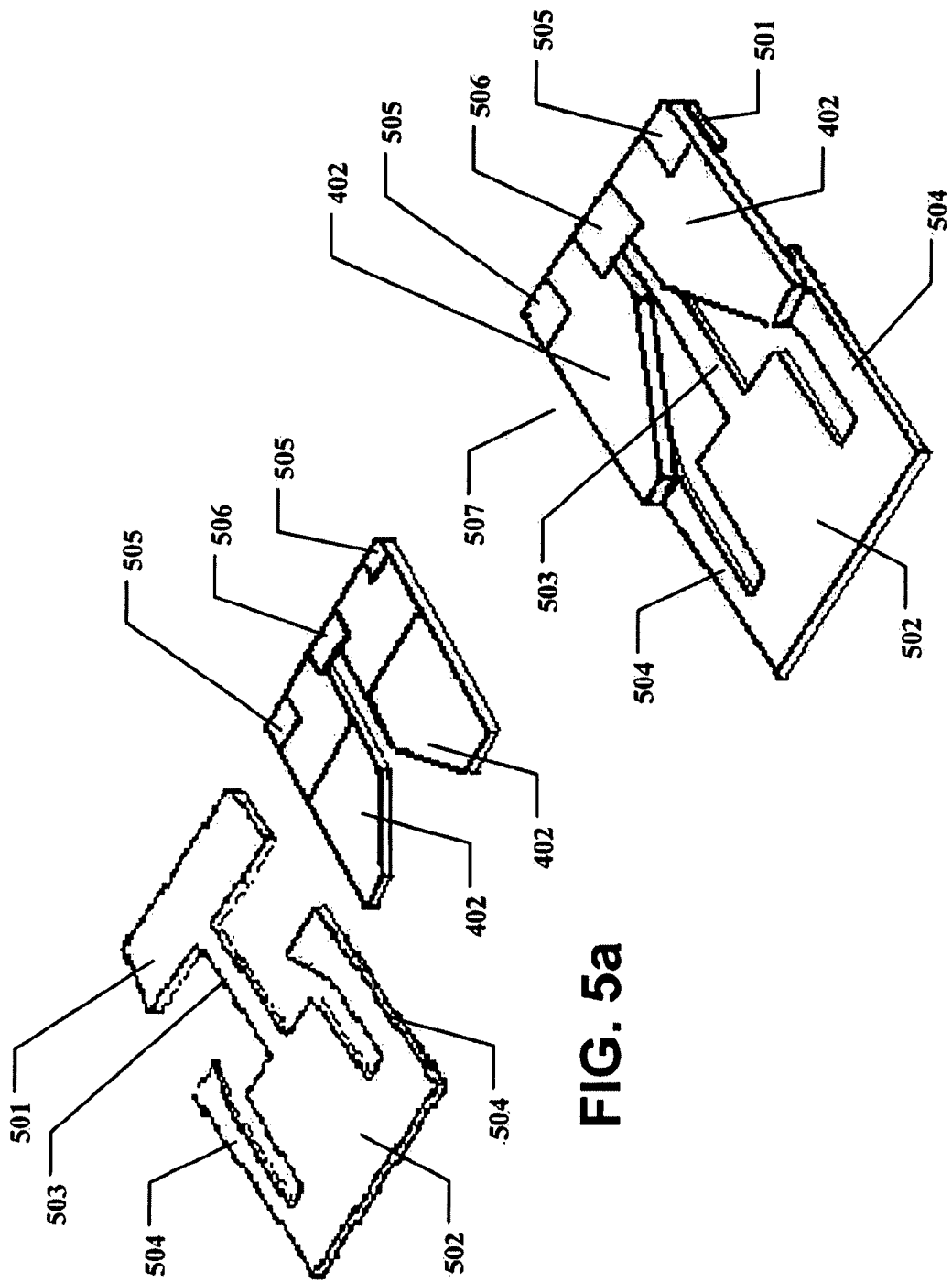

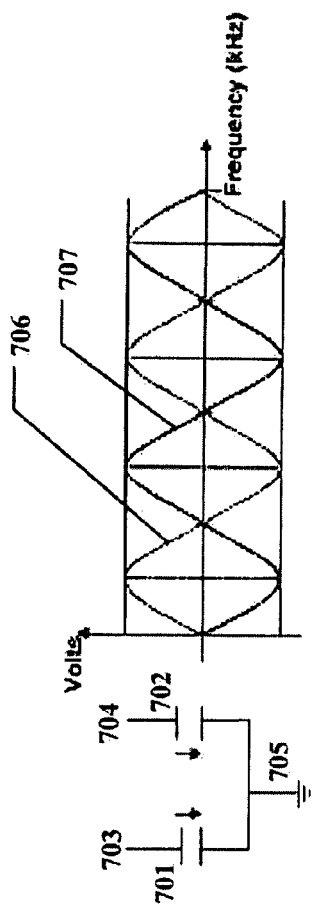
*Figure 7a*
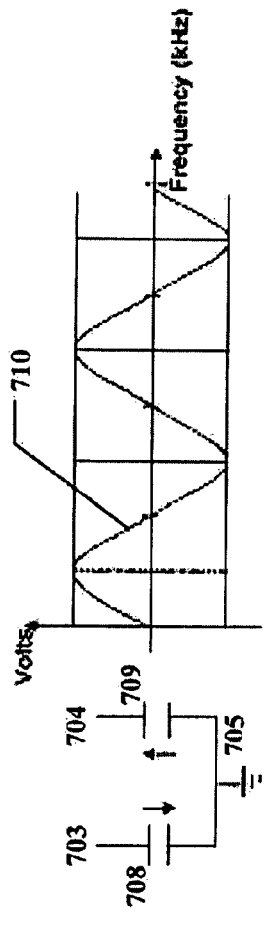
FIG. 7b
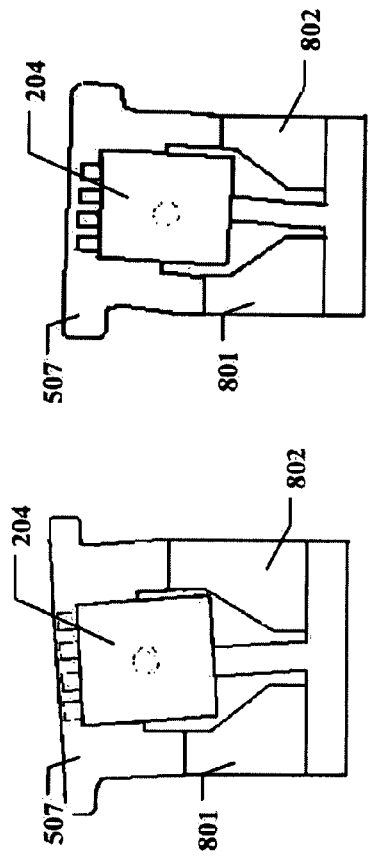
FIG. 8a
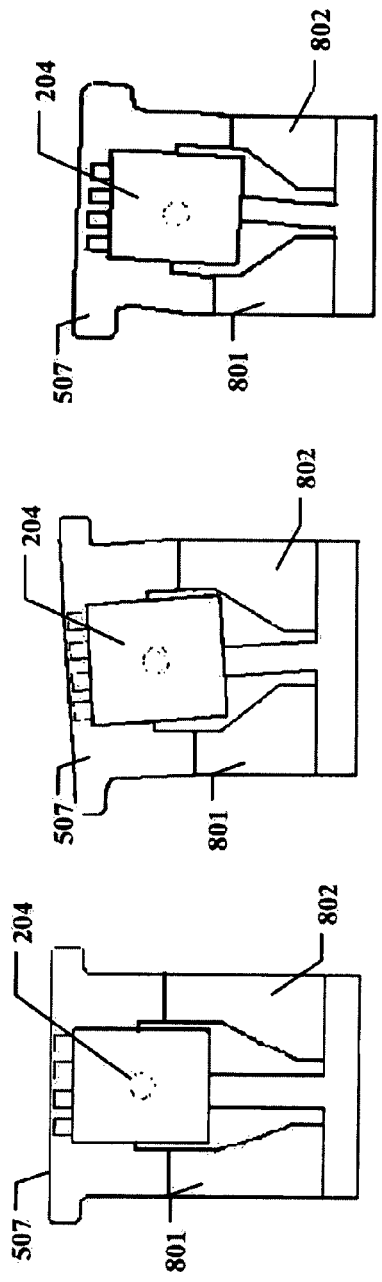
FIG. 8b
FIG. 8c

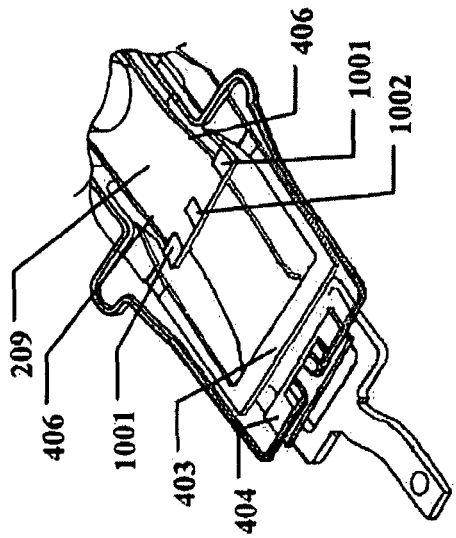
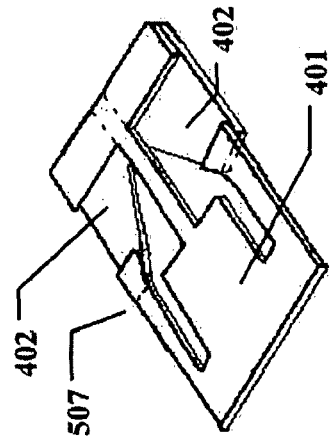
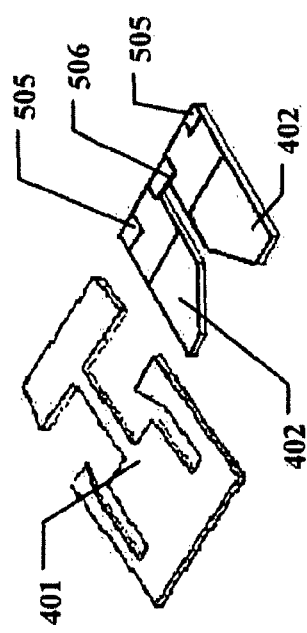
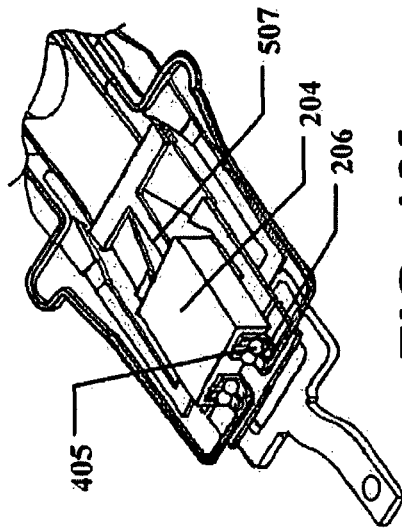
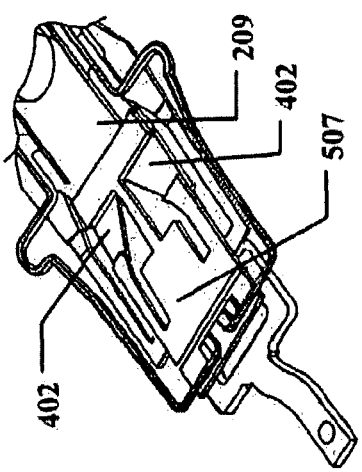
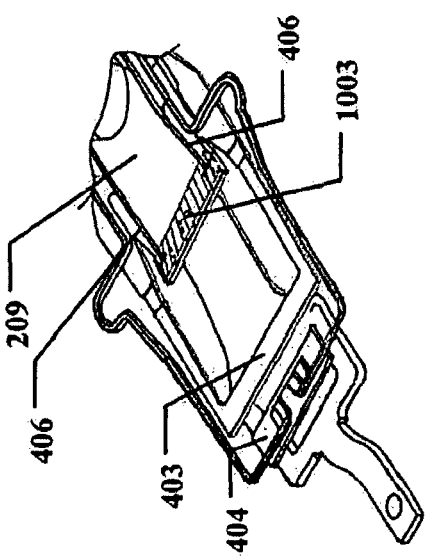

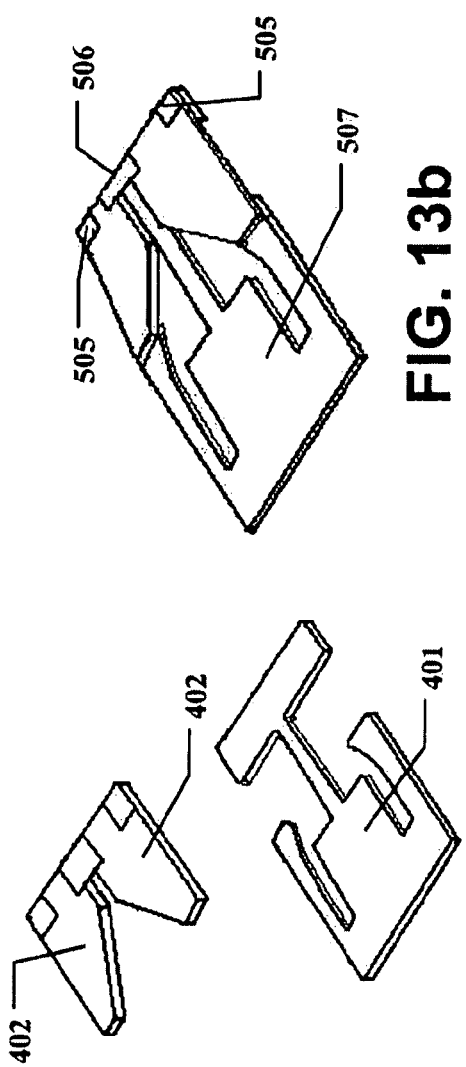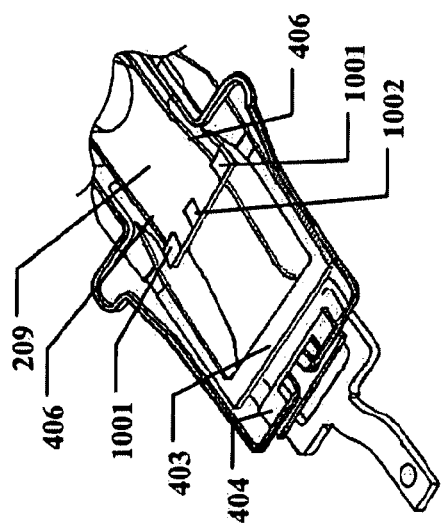

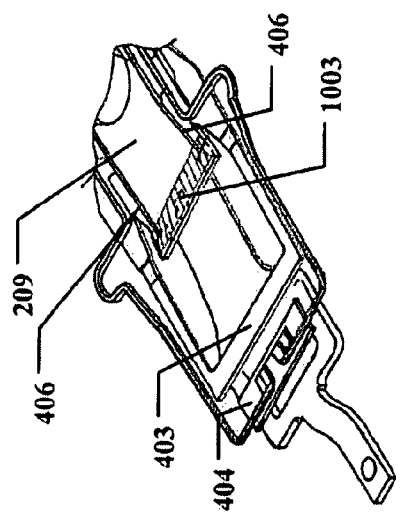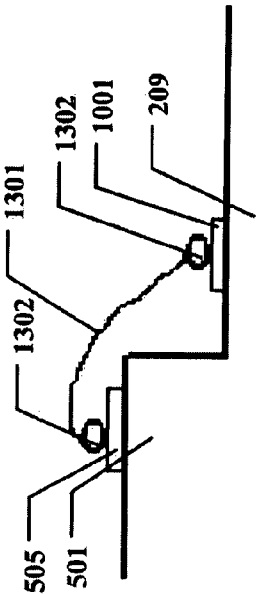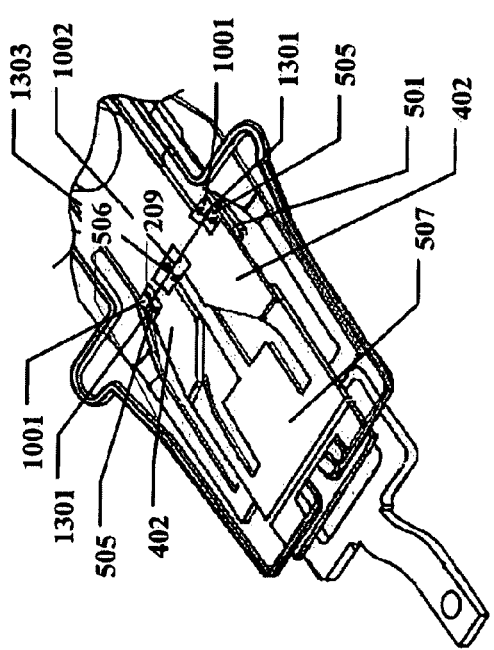

MICRO-ACTUATOR HAVING SWING SUPPORT TO ALLOW HORIZONTAL SWINGING MOVEMENT OF SLIDER SUPPORT

BACKGROUND INFORMATION

The present invention is directed to micro-actuators used in hard disk drive head gimbal assemblies. More specifically, the present invention pertains to thin film piezoelectric micro-actuators.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. The slider is held above the disks by a suspension. The suspension has a load beam and flexure allowing for movement in a direction perpendicular to the disk. The suspension is rotated around a pivot by a voice coil motor to provide coarse position adjustments. A micro-actuator couples the slider to the end of the suspension and allows fine position adjustments to be made.

In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The air flow cooperates with the ABS of the slider body 10 which enables the slider to fly above the spinning disk. In effect, the suspended slider 110 is physically separated from the disk surface 104 through this self-actuating air bearing. The ABS of a slider 110 is generally configured on the slider surface facing the rotating disk 104 (see below), and greatly influences its ability to fly over the disk under various conditions.

FIG. 2a illustrates a micro-actuator with a U-shaped ceramic frame configuration 201. The frame 201 is made of, for example, Zirconia. The frame 201 has two arms 202 opposite a base 203. A slider 204 is held by the two arms 202 at the end opposite the base 203. A strip of piezoelectric material 205 is attached to each arm 202. A bonding pad 206 allows the slider 204 to be electronically connected to a controller. FIG. 2b illustrates the micro-actuator as attached to an actuator suspension flexure 207 and load beam 208. The micro-actuator can be coupled to a suspension tongue 209. Traces 210, coupled along the suspension flexure 207, connect the strips of piezoelectric material 205 to a set of connection pads 211. Voltages applied to the connection pads 211 cause the strips 205 to contract and expand, moving the placement of the slider 204. The suspension flexure 207 can be attached to a base plate 212 with a hole 213 for mounting on a pivot via a suspension hinge 214. A tooling hole 215 facilitates handling of the suspension during manufacture and a suspension hole 216 lightens the weight of the suspension.

FIG. 3 illustrates a prior art method for coupling a slider 204 to a micro-actuator 201. Two drops of epoxy or insulative adhesive 301 are added to both sides of the slider 204. The slider 204 may then be inserted into the U-shaped micro-actuator. The back surfaces of the slider 204 and the micro-actuator 201 are kept at the same height throughout the curing process.

The manufacture of a U-shaped frame is very difficult. The epoxy bonding process is difficult to control, leading to problems with performance. Additionally, the frame itself is bulky, with poor shock performance and a tendency for particle generation and electrostatic damage. Slider tilt during the manufacturing process can create problems with the head gimbal assembly static control. A large amount of voltage is needed to drive the micro-actuator. All this leads to a general poor performance by the U-shaped micro-actuator.

BRIEF DESCRIPTION OF THE DRAWINGS

FIGS. 5a-b illustrate one embodiment of a thin film PZT micro-actuator, according to the present invention.

FIGS. 7a-b illustrate various embodiments of the operation of the thin film pieces of PZT.

FIGS. 8a-c illustrate the effect of the driving voltage on the micro-actuator.

FIGS. 10a-f illustrates in a series of diagrams one embodiment for fabricating a head gimbal assembly with a thin film PZT micro-actuator according to the present invention.

FIGS. 13a-f illustrates an alternate embodiment for thin film PZT micro-actuator according to the present invention.

DETAILED DESCRIPTION

A thin film piezoelectric (PZT) micro-actuator is disclosed. Two thin film pieces of PZT are couple to a metal T-shaped support frame. The T-shaped slider support frame has a slider support connected by a leading beam to a base. The two thin film pieces of PZT connect the slider support to the base. Applied voltage causes the thin film pieces of PZT to contract or expand, moving the slider support in relation to the base. The thin film pieces of PZT can be single or multiple layers. The thin film PZT micro-actuator can be coupled to the suspension by anisotropic conductive film, with the thin film pieces of PZT between the T-shaped slider support frame and the suspension. Alternately, the thin film PZT micro-actuator can be coupled to the suspension with the thin film pieces of PZT exterior to the T-shaped slider support frame and the suspension.

Figure 1:
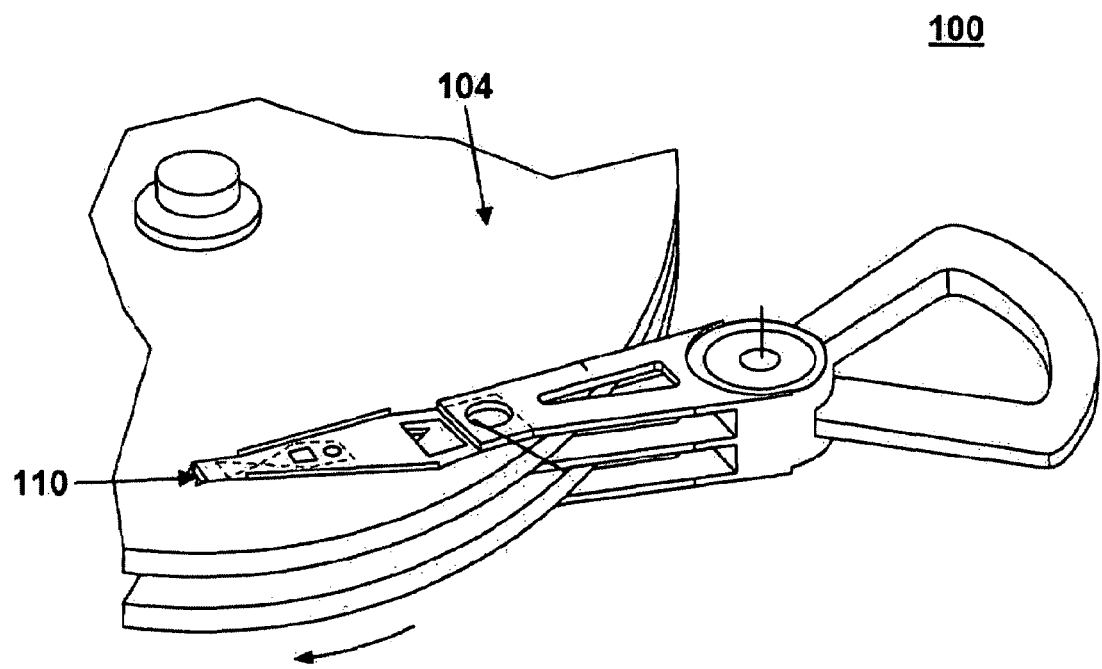
FIG. 1 illustrates a hard disk drive design typical in the art.
Figures 2A, 2B:
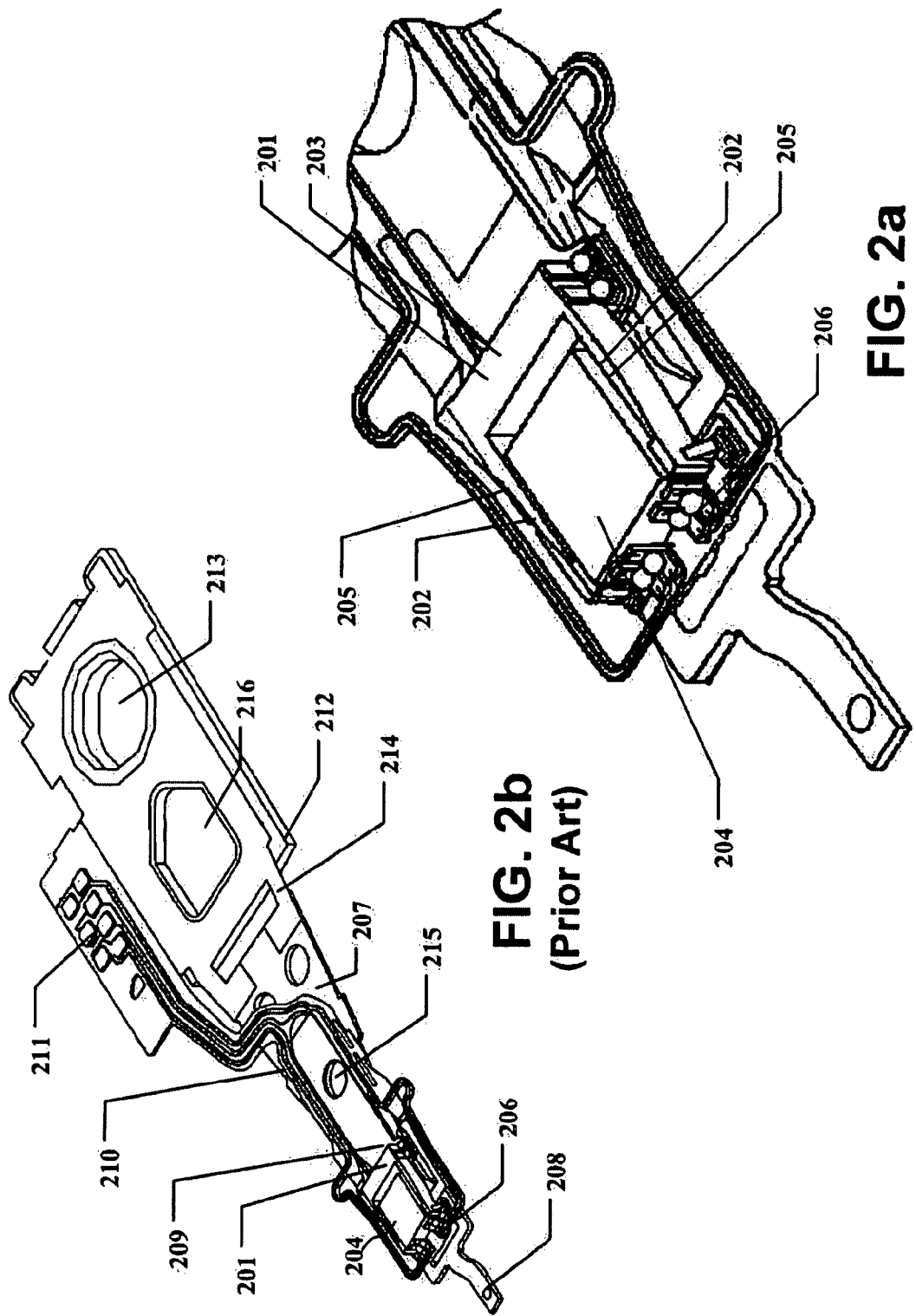
FIGS. 2a-2b illustrates a typical head gimbal assembly having a U-shaped micro-actuator.
Figure 3:
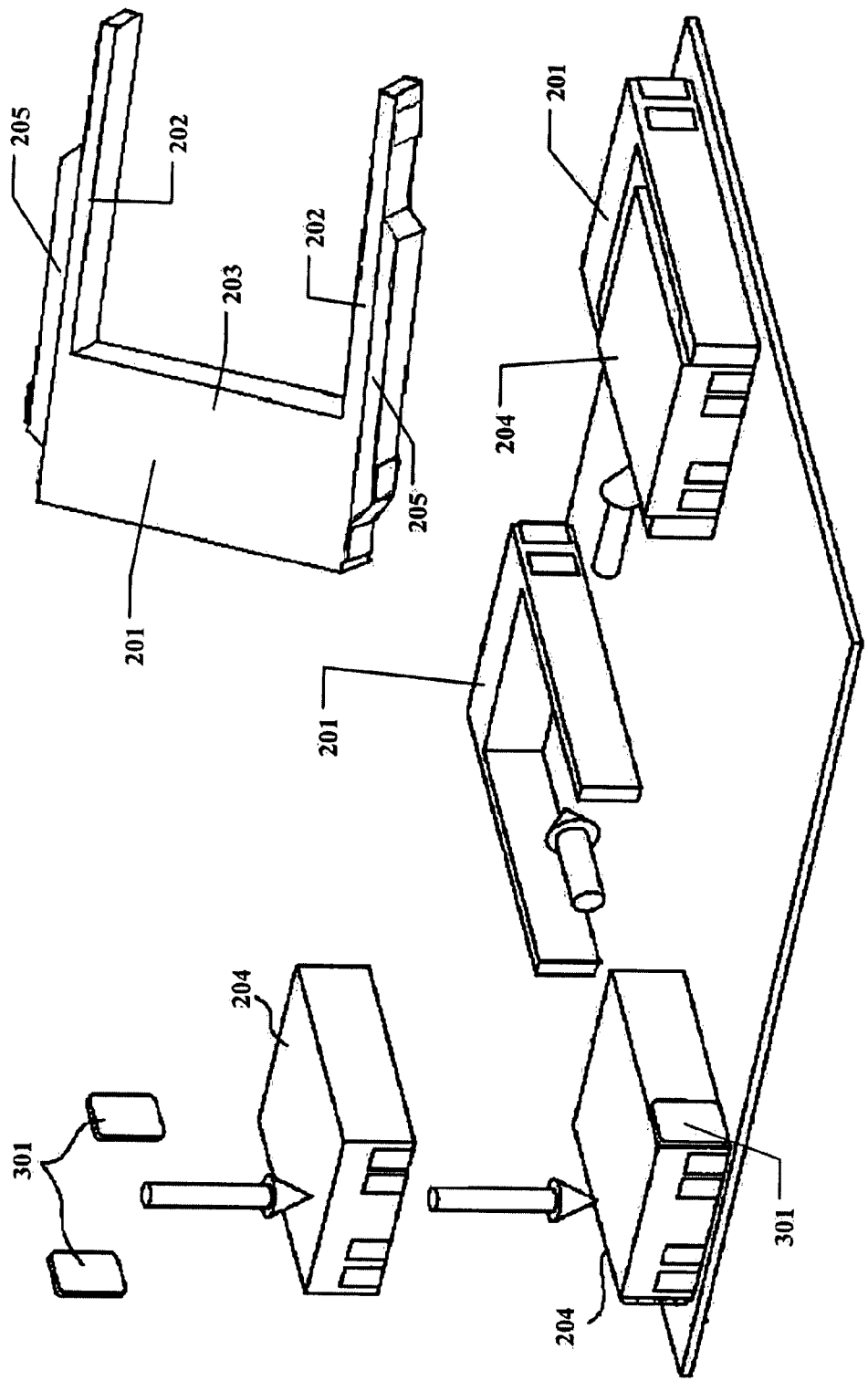
FIG. 3 illustrates a prior art method for coupling a slider to a micro-actuator.
Figure 4A:
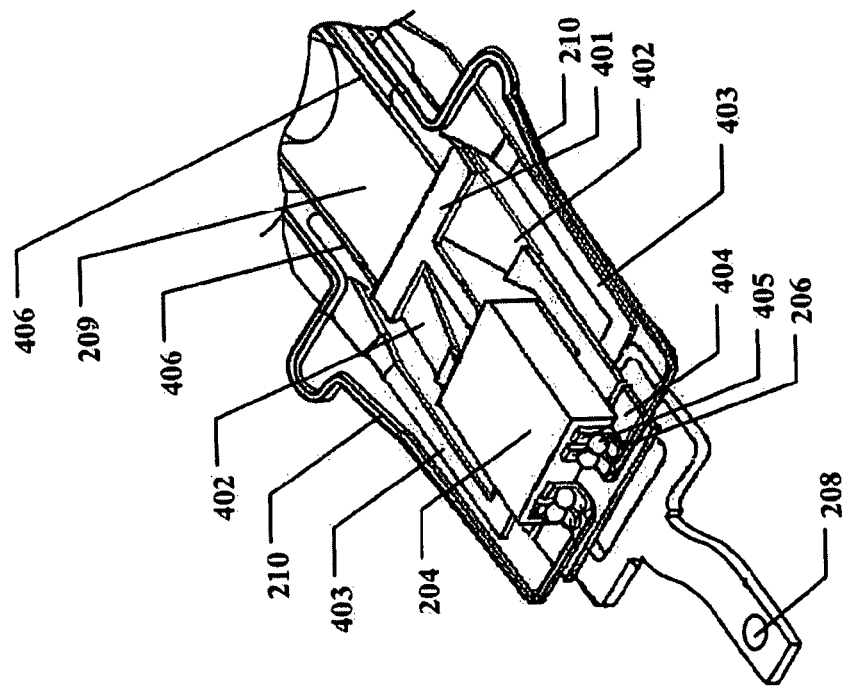
FIGS. 4a-c illustrate one embodiment of a thin film PZT micro-actuator coupled to a head gimbal assembly, according to the present invention.
Figure 4B:
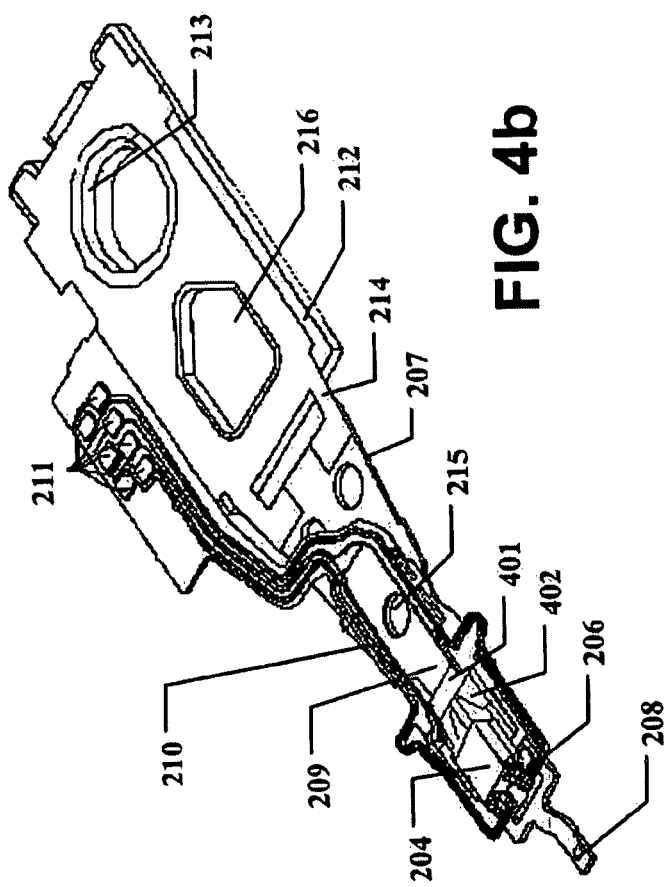
Figure 4C:
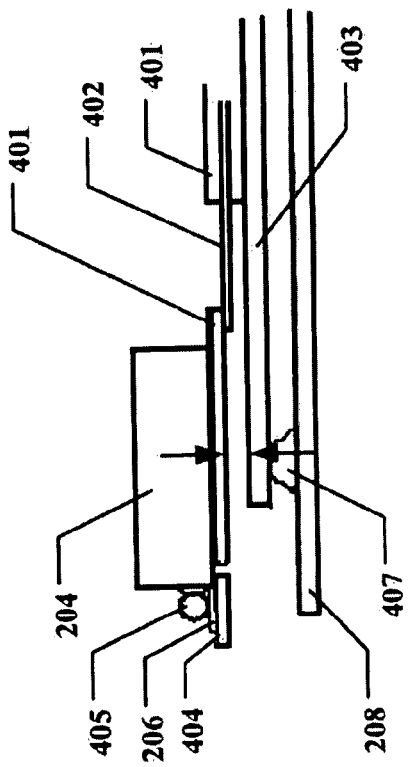

FIGS. 4a-c illustrate one embodiment of a thin film PZT micro-actuator coupled to a head gimbal assembly. FIG. 4a shows a detailed illustration of one embodiment of the micro-actuator coupled to the suspension tongue 209. The slider 204 is coupled to a T-shaped slider support frame 401. In one embodiment, the T-shaped slider support frame is made of metal. A thin film piece of PZT 402 is coupled to each side of the T-shaped slider support frame 401 to act as a position controller. By applying a controlled voltage to each thin film piece of PZT 402, the thin film pieces of PZT 402 are made to expand or contract, causing the front end of the T-shaped slider support frame 401 to be pulled to the left or to the right. In one embodiment, the slider is coupled to the T-shaped slider support frame by anisotropic conductive film (ACF), which electrically couples the slider as well as physically, reducing the likelihood of electrostatic damage. In another embodiment, the slider is physically coupled to the T-shaped slider support frame by UV resin or adhesive and electrically coupled by an silver epoxy or resin. A suspension outrigger 403 supports the T-shaped slider support frame 401. The slider 204 is also electrically connected to a set of bonding pads 206 mounted on a connection plate 404. The slider 204 is electrically connected to the set of bonding pads 206 by gold ball bonding or solder ball bonding 405. The micro-actuator is connected to a set of traces 406 leading back to the connection pads 211. Voltages sent along these traces 406 can be used to control the micro-actuator. FIG. 4b shows one embodiment of the micro-actuator connected to head gimbal assembly. In this embodiment, the set of bonding pads 206 are connected to a set of traces 210 leading to the connection pads 211. FIG. 4c shows in a side view the micro-actuator as connected to a suspension. A parallel gap (indicated by facing arrows in FIG. 4c) is maintained between the suspension outrigger 403 and the T-shaped slider support frame 401, allowing the micro-actuator to move smoothly. The parallel gap can be between 35 and 50 μm. The suspension outriggers 403 and a dimple 407 focus the load force on the center of the slider 204.

FIGS. 5a-b illustrate one embodiment of a thin film PZT micro-actuator. FIG. 5a illustrates one embodiment of the T-shaped slider support frame 401 and the thin film pieces of PZT 402. In one embodiment, the slider support frame has a base 501 coupled to a slider support 502 by a flexible leading beam 503. The base 501 and the flexible leading beam 503 act as a swing support. The base 501 can be used as a datum for alignment purposes when coupling the micro-actuator to the suspension. The leading beam 503 bends to allow the slider support 502 to be moved in a horizontal swinging movement by the thin film pieces of PZT 402 in relation to the base 501. In one embodiment, the width of the leading beam 503 is narrower than the base 501 and the slider support 502. The slider support 502 is flanked by side beams 504 to be attached to the thin film pieces of PZT 402. The thin film pieces of PZT each have an electrical bonding pad 505 that allow an electrical signal to be input. In one embodiment, the thin film pieces of PZT have a common grounding pad 506. In one embodiment, the thin film pieces of PZT 402 are combined with the T-shaped slider support frame 401 to form the thin film PZT micro-actuator 507 illustrated in FIG. 5b. The sides of the thin film pieces of PZT 402 opposite the electrical bonding pads 505 are coupled to the top of the base 501. In one embodiment, the thin film pieces of PZT 402 have an insulation layer (not shown) on each side. The insulation layers only expose the bonding pad. These insulation layers protect the thin film of PZT 402 to prevent electrical shorts during coupling of the metal T-shaped slider support frame and suspension. The thin film pieces of PZT 402 have one end coupled to the base and the other end coupled to the side beams 504 of the slider support 502.

Figure 6:
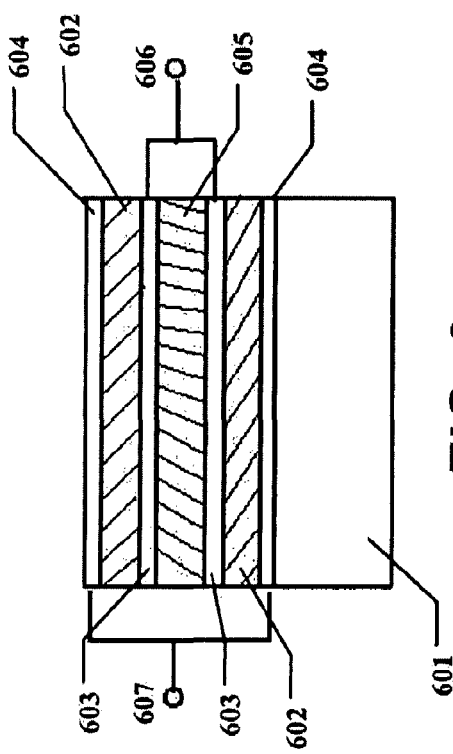
FIG. 6 illustrates one embodiment of a multiple layer thin film piece of piezoelectric material.

The thin film pieces of piezoelectric material can have a single layer or multiple layers. FIG. 6 illustrates one embodiment of a multiple layer thin film piece of PZT 402. The first layer 601 is a base support ductile material, such as a polymide, to protect the PZT and increase the shock performance. The third and seventh layer 602 is a PZT. The third and seventh layers 602 are surrounded by PZT electric layers 603 and 604, representing the second, fourth, sixth, and eighth layers. These PZT electric layer 603 and 604 can be made of platinum, gold, or other similar metals. An insulative adhesive, such as epoxy, layer 605, acting as the fifth layer, couples the fourth and sixth layers 604 to each other. The exterior PZT electric layers 603 are coupled to a first bonding pad 606. The interior PZT electric layers 604 are couple to a second bonding pad 607.

FIGS. 7a-b illustrate various embodiments of the operation of the thin film pieces of PZT. FIG. 7a shows one embodiment of a micro-actuator 507 in which the two thin film pieces of PZT have matching polarities. A first thin film piece of PZT 701 and a second thin film piece of PZT 702 are polarized in the same direction. The first thin film piece of PZT 701 has a first input pad 703, the second thin film piece of PZT 702 has a second input pad 704, and the two thin film pieces of PZT have a common ground 705. A first sine voltage 706 is input to the first input pad 703 and an opposed phase sine voltage 707 is input to the second input pad 704 to drive the micro-actuator. FIG. 7b shows one embodiment of a micro-actuator 507 in which the two thin film pieces of PZT have opposing polarities. The first thin film piece of PZT 708 and the second thin film piece of PZT 709 are polarized in opposite directions. A single sine voltage 710 is input to the first input pad 703 and the second input pad 704 to drive the micro-actuator.

FIGS. 8a-c illustrate the effect of the driving voltage on the micro-actuator. FIG. 8a shows the micro-actuator 507 and slider 204 with no voltage being applied. FIG. 8b shows one embodiment of the micro-actuator 507 and slider 204 with voltage applied. The first thin film piece of PZT 801 is receiving a negative voltage, causing it to shrink. The second thin film piece of PZT 802 is receiving a positive voltage, causing it to extend. This causes the T-shaped slider support frame 401 to bend to the left. FIG. 8c shows an alternate embodiment of the micro-actuator 507 and slider 204 with voltage applied. The first thin film piece of PZT 801 is receiving a positive voltage, causing it to extend. The second thin film piece of PZT 802 is receiving a negative voltage, causing it to shrink. This causes the T-shaped slider support frame 401 to bend to the right.

Figure 9:
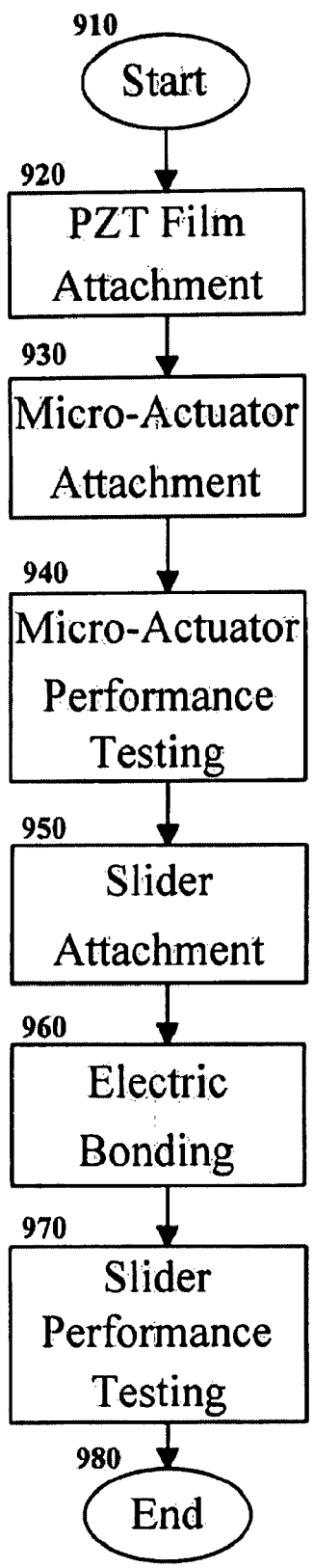
FIG. 9 illustrates in a flowchart one embodiment for fabricating a head gimbal assembly with a thin film PZT micro-actuator according to the present invention.

One embodiment for fabricating a head gimbal assembly with a thin film PZT micro-actuator 507 is illustrated by FIG. 9 in a flowchart and FIGS. 10a-f in a series of diagrams. The process starts (Block 910) with a T-shaped slider support frame 401 and two thin film pieces of PZT 402, as shown in FIG. 10a. Each thin film piece of PZT 402 has an electrical bonding pad 505 and a ground pad 506 common to both thin film pieces. As shown in FIG. 10b, the two thin film pieces of PZT 402 are attached to the T-shape slider support frame 401 to create the thin film PZT micro-actuator 507 (Block 920). FIG. 10c illustrates one embodiment of a suspension on which to mount the thin film PZT micro-actuator 507. In one embodiment, the suspension tongue 209 of the suspension has an electrical bonding pad 1001 for each thin film piece of PZT 402, as well as a grounding pad 1002. The suspension electrical bonding pads 1001 are each electrically linked to a micro-actuator trace 406.

Figure 11:
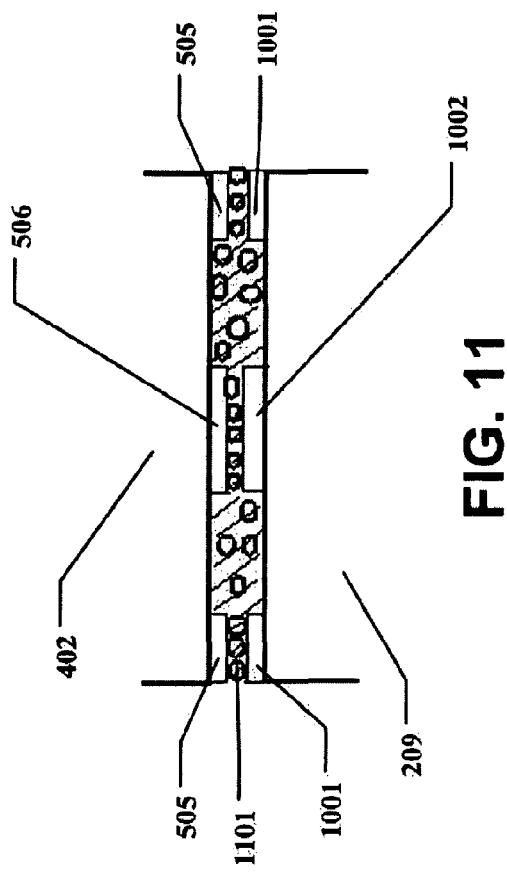
FIG. 11 illustrates one embodiment of using anisotropic conductive film in the bonding process between the thin film pieces of PZT and the suspension tongue.

One option for attaching the thin film PZT micro-actuator is the use of anisotropic conductive film. In one embodiment shown in FIG. 10d, a layer of ACF 1003 is placed across the suspension tongue. In one embodiment shown in FIG. 11, anisotropic conductive film 1101 is used in the bonding process by forming a layer between the thin film pieces of PZT 402 and the suspension tongue 209. The micro-actuator electrical bonding pads 505 are aligned with the suspension electrical bonding pads 1001. The micro-actuator grounding pad 506 is aligned with the suspension grounding pad 1002. A pressure of 30-200 MPa and a temperature of 60-400 Celsius are applied to form the bond. The metal grains in the anisotropic conductive film create an electrical connection, while an insulative adhesive, such as epoxy, creates a physical bond.

Returning to FIG. 9, the thin film PZT micro-actuator 507 is then attached to the suspension tongue 209 by the two thin film pieces of PZT 402 (Block 930), as shown in FIG. 10e. The static and dynamic performance of the thin film PZT micro-actuator 507 is tested to screen out defects (Block 940). As shown in FIG. 10f, the slider 204 is attached to the thin film PZT micro-actuator 507 at the slider support 502 (Block 950). In one embodiment, slider 204 is bonded to the slider support 502 using anisotropic conductive film. The slider 204 is electrically bonded to the bonding pads 206 of the suspension (Block 960). In one embodiment, the slider is electrically bonded using gold ball bonding or solder ball bonding 405. The static dynamic performance of the slider is then tested (Block 970). If no defects are found, the process is completed (Block 980).

Figure 12A:
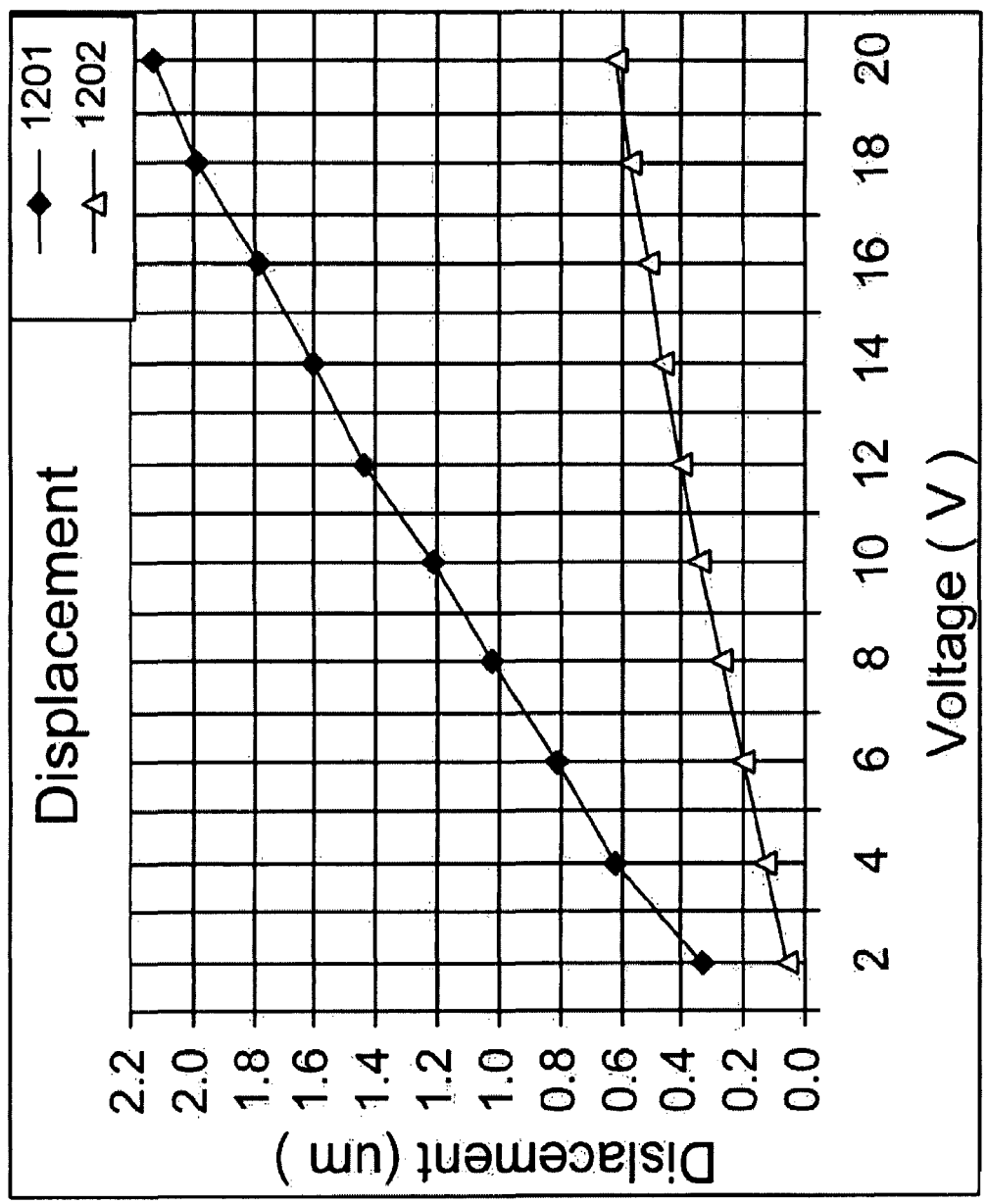
FIGS. 12a-e illustrate in graph form the results of tests comparing the thin film PZT micro-actuator to a traditional U-shaped micro-actuator.
Figure 12C:
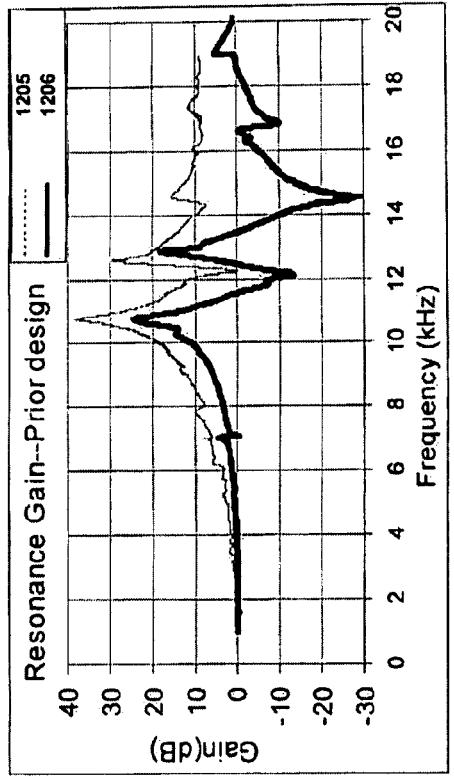
Figure 12B:
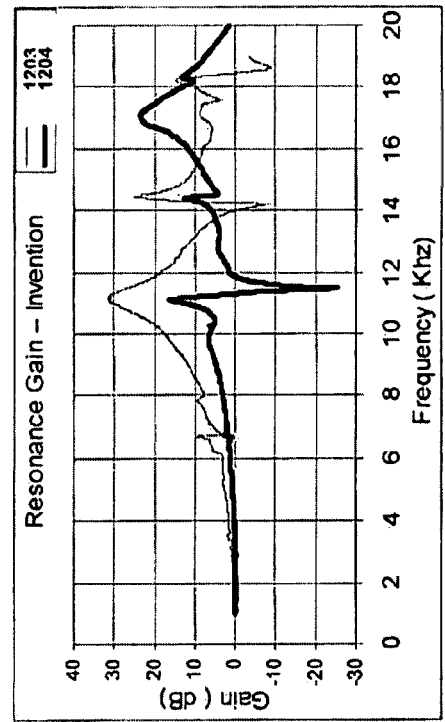
Figure 12E:
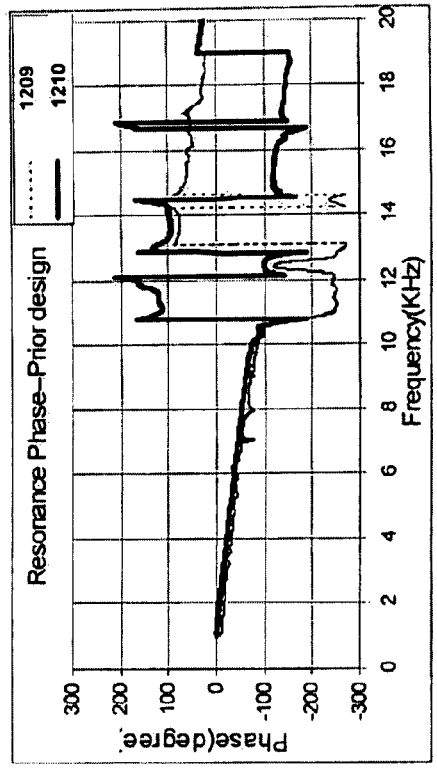
Figure 12D:
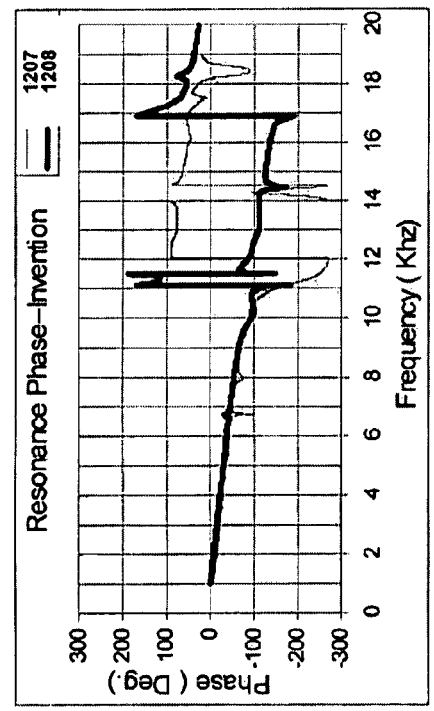

FIGS. 12a-e illustrate in graph form the results of some of these tests as compared to a traditional U-shaped micro-actuator. FIG. 12a shows the displacement in micrometers in response to the voltage applied. A first test 1201 was run with the thin film PZT micro-actuator and a second test 1202 was run with traditional micro-actuator. FIG. 12b shows the resonance gain in decibels at various frequencies in kilohertz for the present invention. A first measurement 1203 is taken by exciting the base plate. A second measurement 1204 is taken by exciting the PZT. FIG. 12c shows the resonance gain in decibels at various frequencies in kilohertz for the prior art. A first measurement 1205 is taken by exciting the base plate. A second measurement 1206 is taken by exciting the PZT. Due to the mass effect, a small gain, from 6-10 dB, is shown in the resonance by the present invention over the prior art. FIG. 12d shows the resonance phase in degrees at various frequencies in kilohertz for the present invention. A first measurement 1207 is taken by exciting the base plate. A second measurement 1208 is taken by exciting the PZT. FIG. 12e shows the resonance gain in decibels at various frequencies in kilohertz for the prior art. A first measurement 1209 is taken by exciting the base plate. A second measurement 1210 is taken by exciting the PZT. Again only a small gain, from 6-10 dB, is shown in the resonance by the present invention over the prior art.

FIGS. 13a-f illustrate an alternate embodiment for thin film PZT micro-actuator. As shown in FIG. 13a, a T-shaped slider support frame 401 and two thin film pieces of PZT 402 are assembled. The two thin film pieces of PZT 402 are coupled to the T-shaped slider support frame 401 to form a thin film PZT micro-actuator 507, as shown in FIG. 13b. FIG. 13c illustrates one embodiment of a suspension on which to mount the thin film PZT micro-actuator 507. In one embodiment, the suspension tongue 209 of the suspension has an electrical bonding pad 1001 for each thin film piece of PZT 402, as well as a grounding pad 1002. The suspension electrical bonding pads 1001 are each electrically linked to a micro-actuator trace 406. In one embodiment shown in FIG. 13d, a layer of ACF 1003 is placed across the suspension tongue. As shown in FIG. 13e, the thin film PZT micro-actuator 507 is coupled to the suspension tongue 209 by the base 501 of the T-shaped slider support frame 401. The thin film pieces of PZT 402 are exterior to the T-shaped slider support frame 401 and the suspension in this embodiment. A support layer (not shown) can be inserted between the base 501 and the suspension tongue 209 to maintain a parallel gap. As shown in FIG. 13f, a wire 1301 couples each micro-actuator electrical bonding pad 505 to the corresponding suspension electrical bonding pad 1001. The wire 1301 can be coupled to the electrical bonding pads by gold ball bonding or silver ball bonding 1302. Similarly, as shown in FIG. 13c, the micro-actuator grounding pad 506 is coupled by a wire 1303 to the suspension grounding pad 1002.

What is claimed:

1. A micro-actuator, comprising:
   a slider support frame with a slider support to hold a slider and a swing support to allow at least a horizontal swinging movement of the slider support wherein the slider support further comprises a first side beam and a second side beam disposed respectively on each side of the slider support and extending alone a substantial lengthwise portion of the slider support frame to couple a position controller to the slider support frame; and
   the position controller, comprising a first electrical bonding pad and a grounding pad, connecting the slider support frame to control the position of the slider.

2. The micro-actuator of claim 1, wherein the swing support includes:
   a base to couple a suspension; and
   a leading beam connecting between the slider support and the base to support the horizontal swinging movement of the slider support.

3. The micro-actuator of claim 2, wherein the swing support is T-shaped.

4. The micro-actuator of claim 2, wherein the leading beam has a narrower width than the slider support or the base.

5. The micro-actuator of claim 1, wherein the position controller includes:
   a first thin film piece of piezoelectric material coupled to a first side of the slider support frame; and
   a second thin film piece of piezoelectric material coupled to a second side of the slider support frame.

6. The micro-actuator of, claim 1 wherein the position controller includes:
   a first thin film piece of piezoelectric material coupled to the first side beam of the slider support; and
   a second thin film piece of piezoelectric material coupled to the second side beam of the slider support.

7. The micro-actuator of claim 5, wherein
   the first electrical bonding pad is electrically coupled to the first thin film piece of piezoelectric material;
   a second electrical bonding pad is electrically coupled to the second thin film piece of piezoelectric material; and
   the grounding pad is electrically coupled to the first thin film piece of piezoelectric material and the second thin film piece of piezoelectric material.

8. The micro-actuator of claim 5, wherein the first thin film piece of piezoelectric material and the second thin film piece of piezoelectric material have one or more layers.

9. The micro-actuator of claim 5, wherein the first thin film piece and the second thin film piece have:
   a first layer of ductile material;
   a third and seventh layer of piezoelectric material above the first layer;
   a second, fourth, sixth, and eighth layer of thin electric material surrounding the third and seventh layers; and
   a fifth layer of an insulative adhesion material coupling the fourth layer to the sixth layer.

\* \* \* \* \*